United States Patent
Ogisu

(10) Patent No.: US 8,446,610 B2
(45) Date of Patent: *May 21, 2013

(54) IMAGE FORMING APPARATUS, POWER-SAVING CONTROL METHOD, AND COMPUTER-READABLE RECORDING MEDIUM IN WHICH POWER-SAVING CONTROL PROGRAM IS RECORDED

(75) Inventor: Takahiro Ogisu, Shizuoka-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 521 days.

This patent is subject to a terminal disclaimer.

(21) Appl. No.: 12/754,785

(22) Filed: Apr. 6, 2010

(65) Prior Publication Data

US 2010/0253965 A1    Oct. 7, 2010

Related U.S. Application Data

(60) Provisional application No. 61/167,185, filed on Apr. 7, 2009.

(51) Int. Cl.
*G06F 15/00* (2006.01)
*G06K 1/00* (2006.01)

(52) U.S. Cl.
USPC .......... 358/1.14; 358/1.9; 358/1.13; 358/1.15

(58) Field of Classification Search
None
See application file for complete search history.

(56) References Cited

FOREIGN PATENT DOCUMENTS

| | | |
|---|---|---|
| JP | 2003167484 | 6/2003 |
| JP | 2005051341 | 2/2005 |
| JP | 2008271118 | 11/2008 |

*Primary Examiner* — Thierry Pham
(74) *Attorney, Agent, or Firm* — Turocy & Watson, LLP

(57) ABSTRACT

The image forming apparatus includes: a sleep control unit which, in a normal operation mode in which power is supplied to a fixing device, if predetermined processing is not executed for a preset time or if an instruction to execute shifting to a power-saving mode with lower power consumption than in the normal operation mode is received, makes a shift to a sleep mode with a lower power consumption than in the normal operation mode, in which at least power supply to the fixing device is stopped; and a super-sleep control unit which makes a shift to a super-sleep mode in which a power source of a processor is turned off if predetermined processing is not executed for a shorter time than the preset time after the shift to the sleep mode is made.

20 Claims, 5 Drawing Sheets

IMAGE FORMING APPARATUS, POWER-SAVING CONTROL METHOD, AND COMPUTER-READABLE RECORDING MEDIUM IN WHICH POWER-SAVING CONTROL PROGRAM IS RECORDED

CROSS-REFERENCE TO RELATED APPLICATION

This application is based upon and claims the benefit of priority from U.S. provisional application 61/167,185, filed on Apr. 7, 2009, the entire contents of which is incorporated herein by reference.

TECHNICAL FIELD

This specification relates to a power-saving technique for an image forming apparatus and particularly to a technique which realizes plural power-saving operation states with different levels of power consumption.

BACKGROUND

Conventionally, in an image forming apparatus such as an MFP (multi-function peripheral), if image formation or image scanning is not executed or there is no operation input for a preset sleep shift time, or if an operation input to designate a shift to a power-saving mode with lower power consumption is received, the operation state of the MFP is switched to a sleep mode (power-saving mode) with lower power consumption.

In the conventional image forming apparatus, when the normal operation state is restored from the operation state of the sleep mode in order to execute certain processing, control is performed to shift to the sleep mode again if a user carries out a power-saving operation to shift to the sleep mode again or if there is already a lapse of a sleep shift time in the state where no processing or operation such as image formation or operation input is executed again after the restoration.

Also, in the conventional image forming apparatus, if a reserved job with designated execution timing is set, control is performed so that the reserved job is constantly searched for even during the sleep mode and the reserved job becomes executed in the designated timing.

Moreover, in the conventional image forming apparatus, if it is not necessary to notify the user that processing is being executed and a job is executed without involving the operation of an image forming unit for forming an image, for example, if only a fax is received during the sleep mode, only the device in a part of the control board is started to execute the processing without lighting a display panel.

In this manner, conventionally, control is performed to shift to the sleep mode if no processing is carried out for a predetermined time or in accordance with an operation input. If certain processing is to be carried out during the sleep mode, control is performed to minimize the range of devices and functions to be awoken from the sleep state. Thus, power consumption is restrained. However, in the case of such control, a system that controls the entire MFP even during the sleep mode needs to be awake in order to control various jobs. Therefore, power consumption is not much restrained.

SUMMARY

To solve the above problems, this specification relates to an image forming apparatus includes: a sleep control unit which, in a normal operation mode in which power is supplied to a fixing device, if predetermined processing is not executed for a preset time or if an instruction to execute shifting to a power-saving mode with lower power consumption than in the normal operation mode is received, makes a shift to a sleep mode with a lower power consumption than in the normal operation mode, in which at least power supply to the fixing device is stopped; and a super-sleep control unit which makes a shift to a super-sleep mode in which a power source of a processor is turned off if predetermined processing is not executed for a shorter time than the preset time after the shift to the sleep mode is made.

This specification relates to a power-saving control method includes: in a normal operation mode in which power is supplied to a fixing device, if predetermined processing is not executed for a preset time or if an instruction to execute shifting to a power-saving mode with lower power consumption than in the normal operation mode is received, making a shift to a sleep mode with a lower power consumption than in the normal operation mode, in which at least power supply to the fixing device is stopped; and making a shift to a super-sleep mode in which a power source of a processor is turned off if predetermined processing is not executed for a shorter time than the preset time after the shift to the sleep mode is made.

This specification relates to a computer-readable recording medium has a power-saving control program recorded therein. The program causes a computer to execute processing including: in a normal operation mode in which power is supplied to a fixing device, if predetermined processing is not executed for a preset time or if an instruction to execute shifting to a power-saving mode with lower power consumption than in the normal operation mode is received, making a shift to a sleep mode with a lower power consumption than in the normal operation mode, in which at least power supply to the fixing device is stopped; and making a shift to a super-sleep mode in which a power source of a processor is turned off if predetermined processing is not executed for a shorter time than the preset time after the shift to the sleep mode is made, and then acquiring a signal as a trigger to cancel the super-sleep mode, and if the power source of the processor is turned on to cancel the super-sleep mode in accordance with the acquired signal and thus an operation state with higher power consumption than in the super-sleep mode is restored, determining whether the acquired signal forms a job to cause an image forming apparatus to execute processing or not.

DETAILED DESCRIPTION

Hereinafter, an embodiment will be described with reference to the drawings.

Figure 1:
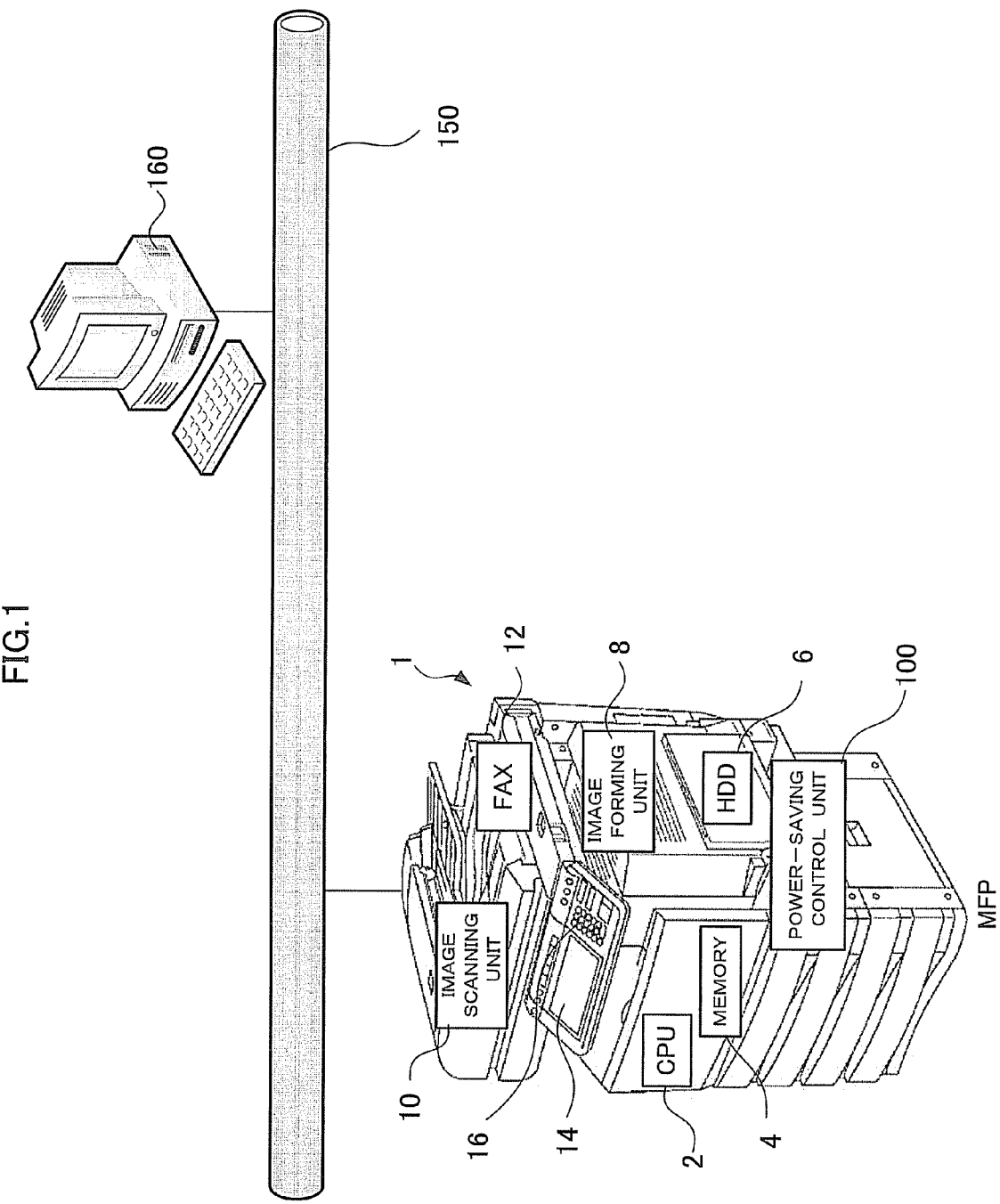
FIG. 1 is a view showing the configuration of an MFP as an image forming apparatus according to an embodiment and the system configuration of a system including the MFP.

FIG. 1 is a view showing the configuration of an MFP (multi-function peripheral) 1 as an image forming apparatus according to this embodiment and the system configuration of a system including the MFP 1. This system includes the MFP 1 and a terminal 160 connected with each other via a network 150. Hereinafter, the configuration of each device constituting this system will be described.

The MFP 1 has a CPU 2 as a processor, a memory 4, an HDD (hard disk drive) 6, an image forming unit 8, an image scanning unit 10, a facsimile 12, a display panel 14, an operation input unit 16, and a power-saving control unit 100.

The MFP 1 according to this embodiment has a function to shift from a normal operation mode to a sleep mode that is a power-saving state where the power source of a predetermined function is turned off, if an image forming job which causes the MFP 1 to execute image formation is not acquired or an operation input signal is not acquired for a preset time, or if an operation input to shift to a power-saving mode with lower power consumption than in the normal operation mode is received from a user. The MFP 1 according to this embodiment also has a function to shift to a super-sleep mode in which the power source of the CPU 2 is turned off, if a predetermined time elapses in the sleep mode state. The super-sleep mode is an operation mode in a power-saving state with even less power consumption than in the sleep mode because the power source of the CPU 2 is turned off. After shifting from the normal operation state to the sleep mode, the MFP 1 of this embodiment quickly shifts to the super-sleep mode if a predetermined condition is met, as described later. Therefore, the MFP 1 has a very high energy-saving effect. Meanwhile, if a certain signal is acquired and the super-sleep mode is canceled but the probability of subsequently using a function of the MFP 1 is low, the MFP 1 has a function to return quickly to the super-sleep mode again. Hereinafter, the configuration of the MFP 1 of this embodiment including the power-saving control unit 100 to realize the above functions will be described in detail.

First, the CPU 2 as a processor executes various kinds of processing in the MFP 1, including image formation and image scanning in the MFP 1. The CPU 2 can realize various functions including the above functions by executing programs stored in the memory 4.

The memory 4 stores programs to execute the above-described image formation, image scanning and so on. The memory 4 also has a function to temporarily store a signal such as an image forming job acquired via the network 150, an operation input signal from the operation input unit 16 or the like. The memory 4 can include, for example, a RAM (random access memory), a ROM (read only memory), a DRAM (dynamic random access memory), a SRAM (static random access memory), a VRAM (video RAM) or the like.

The HDD 6 is an auxiliary storage device which stores various kinds of information in the MFP 1. In this embodiment, the HDD is described as an example of the auxiliary storage device of the MFP 1. However, the auxiliary storage device is not limited to the HDD. For example, a flash memory, an SDD (solid state drive) or a magnetic disk other than the HDD can be used as well.

The image forming unit 8 is a device which forms (prints) an image on a sheet such as a paper when the MFP 1 acquires an image forming job via the network 150 or scans and copies an original by using the image scanning unit 10. The image forming unit 8 has a transfer device which transfers a toner image to a sheet, a fixing device which fixes the transferred toner image to the sheet, and so on.

The image scanning unit 10 is a general image scanning device that is provided in a copier, image scanner or the like. The image scanning unit 10 is used at the time of copying or scanning an original with the MFP 1.

The facsimile 12 is a device which sends and receives a facsimile signal in the MFP 1.

The display panel 14 displays various kinds of information such as the setting information and operating status of the MFP 1. The display panel 14 can include, for example, an LCD (liquid crystal display), an EL (electroluminescence) display, a PDP (plasma display panel), a CRT (cathode ray tube) or the like. If the display panel 14 is formed by a touch panel display, the display panel 14 can realize a part or all of the functions of the operation input unit 16.

The operation input unit 16 performs operations such as designating conditions for copying and scanning, or inputting facsimile numbers. The operation input unit 16 can include, for example, numeric and other input keys, keyboard, mouse, touch panel, touchpad, graphics tablet or the like.

The power-saving control unit 100 carries out shifting to the above-described sleep mode and shifting to the super-sleep mode. The power-saving control unit 100 includes ASIC (application specific integrated circuit).

As another part of the system configuration, the network 150 is a communication network including, for example, the internet, LAN (local area network), or WAN (wide area network).

The terminal 160 connected to the network 150 outputs an image forming job and the like to the MFP 1 via the network 150.

In the embodiment, one job (i.e. an image forming job) is a direction unit causing the MFP to execute the process such as image formation and image scanning. And one process (or processing) is an executable unit of the action executed by the MFP. For example, the copy job comprises image scanning process and image formation process.

Next, power-saving control executed by the MFP 1 according to this embodiment will be described.

Figure 2:
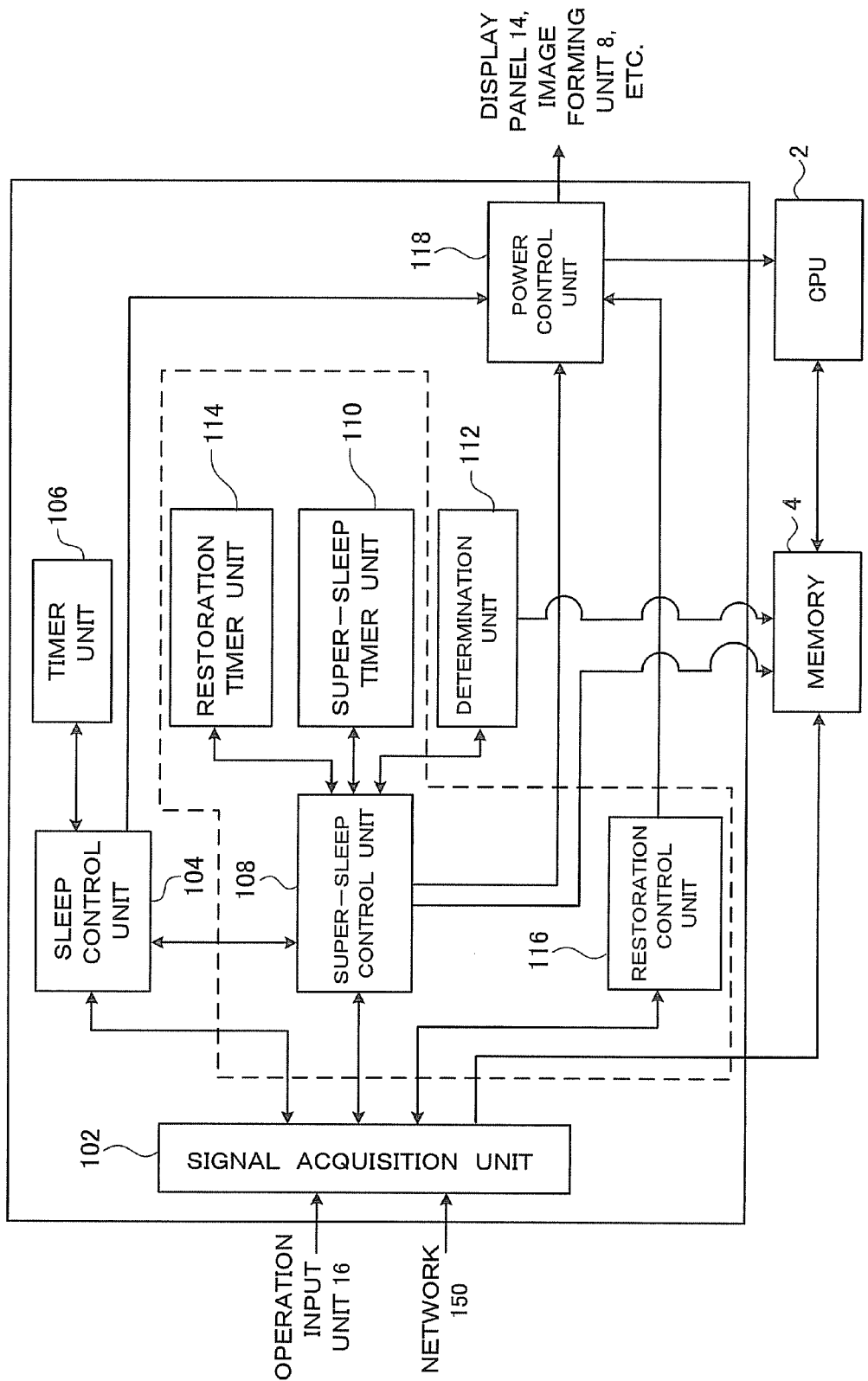
FIG. 2 is a functional block diagram for explaining functions of the MFP according to the embodiment.

FIG. 2 is a functional block diagram for explaining functions of the MFP 1 of this embodiment.

The MFP 1 of this embodiment has a signal acquisition unit 102, a sleep control unit 104, a sleep timer unit 106, a super-sleep control unit 108, a super-sleep timer unit 110, a determination unit 112, a restoration timer unit 114, a restoration control unit 116, and a power control unit 118.

The signal acquisition unit 102 acquires an operation input signal from the operation input unit 16 and an image forming job or other communication signals and so on from the network 150.

In a normal operation state, if there is already a lapse of a preset sleep mode shift time in the state where a predetermined signal such as an image forming job or an operation input signal is not acquired, or if an operation input to shift to the sleep mode is received from the user, the sleep control unit 104 executes processing to shift to the sleep mode with lower power consumption than in the normal operation state. Specifically, in the case of shifting to the sleep mode, if a signal indicating the lapse of the sleep mode shift time is acquired from the sleep timer unit 106, the sleep control unit 104 gives the power control unit 118 an instruction to turn off the power source of the image forming unit 8, the display panel 14 or the like and thus shifts the operation state to the sleep mode.

The "normal operation state" refers to a state where power is supplied to at least the fixing device of the image forming unit 8 and the CPU 2 so that image formation or the like is executable. The sleep mode refers to an operation state where power supply to the fixing device of the image forming unit 8 is usually stopped.

The sleep control unit 104 shifts the operation state to the sleep mode when no signal is acquired, and the kind of this signal is not particularly limited and can be freely set in accordance with the environment where the MFP 1 is used. The device to have its power source turned off and the function to be stopped in the sleep mode can be freely set as well. The sleep mode shift time can be freely set. However, in the case of turning off the power source of the image forming unit 8 as the operation state shifts to the sleep mode, it takes time before the image forming unit 8 becomes able to form an image again. Therefore, the sleep mode shift time is typically set to approximately 3 minutes so that a shift to the sleep mode does not occur too often. In addition, the sleep mode sift time may be set by selecting from several levels (i.e. 21 levels) within 1~240 minutes.

The sleep timer unit 106 measures the sleep mode shift time for the sleep control unit 104 to shift the operation state from the normal operation state to the sleep mode. For example, in the case of shifting to the sleep mode if there is no image forming job or operation input for one hour, the sleep timer unit 106 starts measuring the time from when no image forming job or the like is acquired any longer. After the lapse of one hour, the sleep timer unit 106 outputs a signal indicating the lapse of the sleep mode shift time to the sleep control unit 104. When the signal is acquired, the sleep control unit 104 executes processing to shift to the sleep mode.

The super-sleep control unit 108 realizes processing to shift to the super-sleep mode in which the power source of the CPU 2 is turned off, if there is already a lapse of a preset super-sleep mode shift time in the state where the MFP 1 is operating in the sleep mode with no acquisition of a predetermined signal after the sleep mode is started. Specifically, similarly to the shift to the sleep mode, if a signal is acquired which is sent from the super-sleep timer unit 110 after the lapse of the super-sleep mode shift time, the super-sleep control unit 108 gives the power control unit 118 an instruction to turn off the power source of the CPU 2 and thus shifts the operation state to the super-sleep mode.

The super-sleep control unit 108 also searches for a reserved job with its execution timing (time when the job is to be executed or time period until the job is executed) designated in advance, before executing processing to turn off the power source of the CPU 2. For example, the memory 4 having reserved jobs stored therein in advance, the HDD 6 or the like is searched. If there is a reserved job, the super-sleep control unit 108 carries out processing to set the time when the restoration timer unit 114 should be made to output a restoration instruction signal (cancelation signal) to turn on the power source of the CPU 2, with reference to the timing of a job which has the closest execution timing to that time point. For example, if the reserved job having the closest timing is to be executed in two hours, the restoration timer unit 114 is set to send, to the power control unit 118, the restoration instruction signal to turn on the power source of the CPU 2 before that time of the reserved job. This processing is carried out because, if the operation state is shifted to the super-sleep mode and the power source of the CPU 2 is turned off, the reserved job cannot be executed unless the power source of the CPU 2 which executes the reserved job is returned to on-state again before the time of the reserved job. Any timing before the time of the reserved job can be employed as long as it is possible to secure a time that is long enough to turn on the power source of the CPU 2 and to enable the CPU 2 to execute the reserved job at the reserved time.

The super-sleep timer unit 110 measures the super-sleep mode shift time, at the end of which the super-sleep control unit 108 shifts the operation state from the sleep mode to the super-sleep mode.

Here, it is preferable that the super-sleep mode shift time is set to be shorter than the sleep mode shift time. As the super-sleep mode shift time is shorter than the sleep mode shift time, a shift to the operation state with even lower power consumption can be quickly made and therefore the energy-saving effect can be further enhanced. In shifting to the sleep mode, since the shift to the sleep mode is made after the state with no acquisition of a predetermined signal lasts for a relatively long time, the state where there is no need to restore the operation state is highly likely to continue. Therefore, in that state, whether the power source of the CPU 2 is on or off makes little difference in terms of convenience. It is more advantageous in terms of power-saving to immediately turn off the power source of the CPU 2, thus restrain power consumption, and then shift to the super-sleep mode, which is a highly effective power-saving mode. In short, if the power source of the image forming unit 8 is turned off in the sleep mode, the time required for the image forming unit 8 to restore a temperature at which image formation is possible is much longer than the time required for turning on the power source of the CPU 2 and enabling the CPU 2 to operate. Therefore, once the operation state is shifted to the sleep mode, there is little practical difference between the time until the normal operation state is restored from the sleep mode and the time until the normal operation state is restored from the super-sleep mode in which the power source of the CPU 2 is off. Thus, if the operation state is shifted to the sleep mode, it is possible to effectively restrain power consumption without sacrificing convenience, by shifting to the super-sleep mode within a shorter time period than the sleep mode shift time. In view of the power-saving effect, it is preferable that the super-sleep mode shift time is approximately 5 to 30 seconds.

In the super-sleep mode, if the signal acquisition unit 102 acquires a certain signal and the signal is temporarily saved in the memory 4 or the like, the determination unit 112 determines whether or not the acquired signal forms a job that needs to be actually executed by the MFP 1. In the MFP 1, signals acquired via the network 150 include a packet or the like that does not form a job and hence does not require the restoration from the sleep mode, as well as jobs such as an image forming job. In such cases, if the normal operation state is restored, it takes the same long time as the sleep shift time to shift to the sleep mode or the super-sleep mode again. Thus, the power-saving effect is lowered. Therefore, the determination unit 112 determines whether the acquired signal forms a job or not, and if it is determined that the signal does not form a job, that is, there is no need to restore the normal operation state, the super-sleep control unit 108 executes processing to shift quickly to the super-sleep mode again in accordance with the result of the determination.

The restoration timer unit 114 outputs the restoration instruction signal (cancelation signal) to turn on the power source of the CPU 2 to the power control unit 118 in the timing (time or time period) designated in advance by the super-sleep control unit 108. The restoration timer unit 114 has an independent power source such as a battery and its power source is not turned off even in the sleep mode or the super-sleep mode.

If the signal acquisition unit 102 acquires a signal such as an operation input signal from the operation input unit 16 or an image forming job from the network 150, the restoration control unit 116 executes processing to cancel the sleep mode or the super-sleep mode in response to the acquisition of the signal as a trigger. Specifically, if the signal acquisition unit 102 acquires the above signal, the restoration control unit 116 carries out processing to cause the power control unit 118 to turn on the power source of a part or all of the devices having their power source off and thus restore the normal operation state from the power-saving mode.

The restoration is not limited to returning to the normal operation state and may include restoration of the on-state of at least one or more devices or functions. For example, the restoration may be the processing to restore the sleep mode from the super-sleep mode. The signal for performing the restoration may be of the same type as or a different type from the signal as in the case where the sleep control unit 104 shifts the operation state to the sleep mode when there is no acquisition of the signal for the predetermined time.

The power control unit 118 controls power supply to each device of the MFP 1 including the CPU 2, the image forming unit 8 and the display panel 14. In this embodiment, the power control unit 118 carries out processing to turn off the power source of the devices in accordance with an instruction from the sleep control unit 104, the super-sleep control unit 108 or the like, or to turn on the power source of a device having its power source off in accordance with an instruction from the restoration control unit 116 or the restoration timer unit 114.

The above-described are the functional blocks provided in the MFP 1 of this embodiment. These functional blocks can be realized by a circuit such as an ASIC provided in the MFP 1. The functional blocks may also be realized by a combination of a circuit and a function realized via the execution of a program by the CPU 2. In this embodiment, at least the super-sleep control unit 108, the super-sleep timer unit 110, the restoration timer unit 114 and the restoration control unit 116, surrounded by the broken line in FIG. 2, are functions which are executed when the power source of the CPU 2 is off. Therefore, it is preferable that these functions are realized by a circuit such as an ASIC included in the power-saving control unit 100. In other words, functions (the determination unit 112 or the like) which are used only when the power source of the CPU 2 is on, may be realized as the CPU 2 executes a program.

With the MFP 1 of this embodiment having the above configuration, after a shift to the sleep mode, the operation state can be shifted in a very short time period to the super-sleep mode in which the power source of the CPU 2 is turned off. Thus, more effective power-saving operation can be realized.

Also, with the MFP 1 of this embodiment, if a certain signal is acquired and the super-sleep mode is canceled, the determination unit 112 determines whether the acquired signal forms a job or not. If the acquired signal does not form a job and the super-sleep mode need not to be canceled, the operation state can be immediately shifted to the super-sleep mode again. Thus, even if the power source of the CPU 2 is turned on and the restoration from the super-sleep mode is carried out in accordance with an acquired signal which is not supposed to require the CPU 2 to execute processing, the power source of the CPU 2 is turned off in a short time period without waiting for the lapse of the time for shifting to the sleep mode. Therefore, highly effective power-saving operation can be realized.

Moreover, with the MFP 1 of this embodiment, even if the operation state is shifted to the super-sleep mode and the power source of the CPU 2 is turned off when there is a reserved job, the power source of the CPU 2 can be turned on by the restoration timer unit 114 in accordance with the time of the reserved job. Thus, the reserved job is executed on time even in the state where the operation state is shifted to the super-sleep mode and the power source of the CPU 2 is turned off.

Next, the flow of processing executed by each function of the MFP 1 according to this embodiment will be described.

Figure 3:
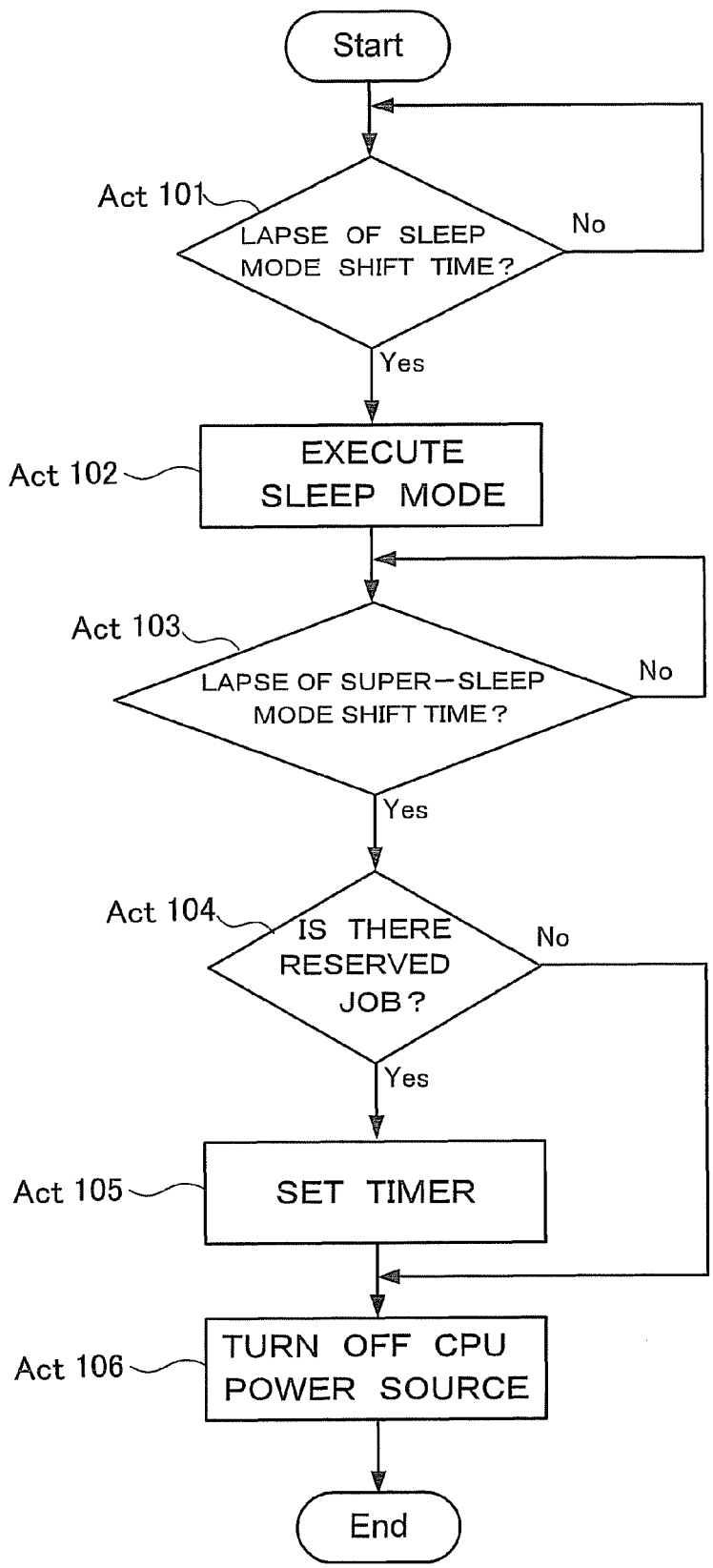
FIG. 3 is a flowchart for explaining a flow of processing in which the MFP shifts to a sleep mode and a super-sleep mode.

First, processing in which the MFP 1 shifts from the normal operation state to the sleep mode and then further shifts to the super-sleep mode will be described. FIG. 3 is a flowchart for explaining the flow of the processing in which the MFP 1 shifts to the sleep mode and the super-sleep mode.

First, in Act 101, the sleep control unit 104 determines whether or not there is already a lapse of the preset sleep mode shift time in the state where a predetermined signal such as an image forming job or an operation input signal is not acquired in the normal operation state.

If the sleep control unit 104 acquires a signal indicating that there is already a lapse of the sleep mode shift time from the sleep timer unit 106, the sleep control unit 104 determines that there is already a lapse of the sleep mode shift time. Thus, in Act 102, the sleep control unit 104 executes processing to shift the operation state to the sleep mode. Specifically, the sleep control unit 104 executes processing to cause the power control unit 118 to turn off the power source of a predetermined device or to stop a predetermined function, and thus shifts the operation state to the sleep mode.

If the sleep mode shift time is yet to elapse in Act 101, this determination is repeated until the time elapses.

Next, in Act 103, the super-sleep control unit 108 determines whether or not there is already a lapse of the super-sleep mode shift time after the MFP 1 is shifted to the sleep mode.

If the super-sleep control unit 108 acquires a signal indicating that there is already a lapse of the super-sleep mode shift time from the super-sleep timer unit 110, the super-sleep control unit 108 determines that there is already a lapse of the super-sleep mode shift time. Thus, in Act 104, search for a reserved job is executed immediately before the power source of the CPU 2 is turned off.

If the super-sleep mode shift time is yet to elapse in Act 103, this determination is repeated until the time elapses.

If there is a reserved job in Act 104, the super-sleep control unit 108 sets the restoration timer unit 114 so that the power source of the CPU 2 is turned on before the time of a job having the closest execution timing to that time point, among reserved jobs. If there is no reserved job in Act 104, the processing goes to Act 106 without setting the timer.

Next, in Act 106, the super-sleep control unit 108 causes the power control unit 118 to execute processing to turn off the power source of the CPU 2 and to shift the operation state to the super-sleep mode.

The above-described is the flow of the shift to the super-sleep mode in the MFP 1 of this embodiment.

In the flow shown in FIG. 3, a shift to the sleep mode is made if a predetermined signal such as an image forming job or an operation input is not acquired for a predetermined time. However, also when an operation input to shift to the sleep mode is received from the user, as described above, the processing of Act 102 and the subsequent Acts is similarly executed and the operation state can be shifted to the super-sleep mode.

In the flow of the shift to the sleep mode and the super-sleep mode, if an image forming job, an operation input signal or the like is acquired, this flow is forcedly ended and the normal operation state is restored. Then, processing based on the acquired signal is executed by the CPU 2 or the like.

Figure 4:
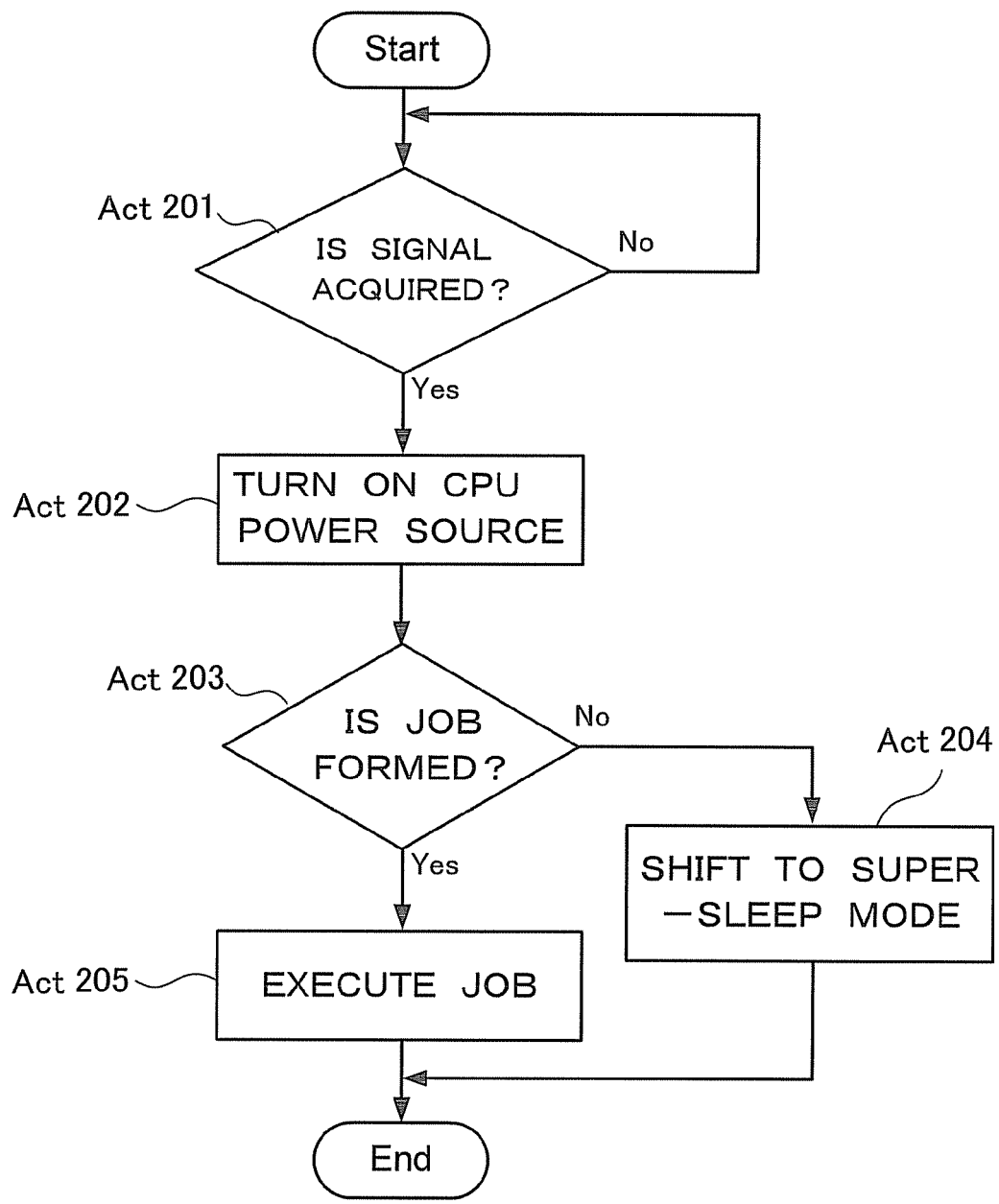
FIG. 4 is a flowchart for explaining a flow of processing in which the MFP returns from the super-sleep mode.

Next, the flow of restoration from the super-sleep mode in the MFP 1 according to this embodiment will be described. FIG. 4 is a flowchart for explaining the flow of processing in which the MFP 1 returns from the super-sleep mode.

First, in Act 201, the restoration control unit 116 determines whether a certain signal such as an image forming job or an operation input signal is acquired by the signal acquisition unit 102 or not. If no signal is acquired in Act 201, the super-sleep mode is maintained and the determination as to whether a signal is acquired or not is repeated.

Next, if a certain signal is acquired in Act 201, the restoration control unit 116 causes the power control unit 118 to execute processing to turn on the power source of the CPU 2. Thus, the super-sleep mode is canceled.

Next, in Act 203, the determination unit 112 determines whether the acquired signal forms a job or not, with reference to the memory 4 or the like.

If the acquired signal forms a job, processing corresponding to the acquired signal is executed in the state where the super-sleep mode is canceled (for example, the normal operation state), in Act 204. For example, if the acquired signal forms an image forming job, the image forming job is executed by the image forming unit 8, the CPU 2 and the like.

If it is determined in Act 203 that the acquired signal does not form a job and therefore does not require cancelation of the super-sleep mode, the processing to shift to the super-sleep mode from Act 103 shown in FIG. 3 is executed in Act 205 and the operation state immediately returns to the super-sleep mode again. In this case of shifting to the super-sleep mode again, the processing for searching for a reserved job in Act 104 and Act 105 may be omitted.

The above-described is the flow of the restoration from the super-sleep mode in the MFP 1 of this embodiment.

Figure 5:
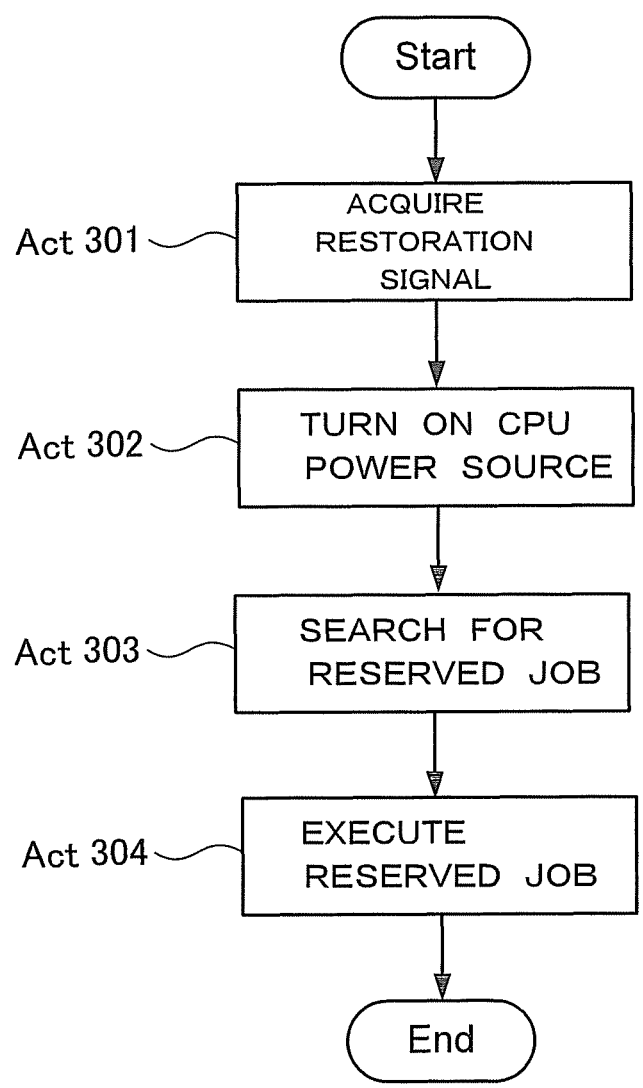
FIG. 5 is a flowchart for explaining a flow of restoration processing executed by the MFP in accordance with a signal from a restoration timer unit.

Next, the flow of restoration based on a restoration instruction signal from the restoration timer unit 114 in the MFP 1 of this embodiment will be described. FIG. 5 is a flowchart for explaining the flow of restoration executed on the basis of a signal from the restoration timer unit 114 in the MFP 1.

First, in Act 301, if the time to cancel the super-sleep mode that is set in advance in the restoration timer unit 114 by the super-sleep control unit 108 is reached, the power control unit 118 acquires a restoration instruction signal that instructs the power control unit 118 to turn on the power source of the CPU 2, from the restoration timer unit 114.

Next, in Act 302, the power control unit 118 executes processing to turn on the power source of the CPU 2.

Next, in Act 303, the CPU 2 once again executes processing to search for a reserved job that is registered in the memory 4, the HDD 6 or the like.

Next, in Act 304, the CPU 2 executes a reserved job serving as an element that decides the timing when the restoration timer unit 114 is made to output the restoration instruction signal.

The search for a reserved job in Act 303 and the execution of the job in Act 304 are executed as the CPU 2 executes programs stored in the memory 4 and thus functions as a reserved processing control unit.

The above-described is the flow of restoration based on the signal from the restoration timer unit 114 in the MFP 1 of this embodiment.

With the MFP 1 according to this embodiment, the operation state can be shifted from the sleep mode to the super-sleep mode in which the power source of the CPU 2 is turned off, in a much shorter time period than the time taken for shifting from the normal operation state to the sleep mode.

Also, the functions of the super-sleep control unit 108 and the restoration timer unit 114 enables the CPU 2 to execute, on time, a reserved job with designated execution timing, even if the operation state shifts to the super-sleep mode and the power source of the CPU 2 is turned off.

Thus, with the MFP 1 according to this embodiment, the super-sleep mode can be realized, which is an operation state having little difference from the sleep mode in terms of functions and convenience but having lower power consumption and higher power-saving effect than the sleep mode.

In the embodiment, at the time of shifting to the super-sleep mode, the super-sleep control unit 108 searches for a reserved job. However, the search is not limited to this method. A dedicated functional block to execute the search may be provided, or the CPU 2 with its power source being still on may execute a reserved job search program and thus execute the search. In this case, the device or functional block which executes the search may set the time to cancel the super-sleep mode, in the restoration timer unit 114.

In the embodiment, if the MFP 1 in the super-sleep mode acquires a certain signal and then the supers-sleep mode is canceled but the acquired signal does not form a job, the operation state immediately shifts to the super-sleep mode again. However, the shift to the super-sleep mode is not limited to this embodiment. For example, this shift can be similarly applied to a case where a facsimile reception mode is set so that only the reception of a facsimile is carried out without turning on the power source of the display panel 14 or the like when a facsimile is received in the sleep mode or the super-sleep mode. In short, if the facsimile mode is set, after the facsimile reception is carried out, the operation state can be shifted to the super-sleep mode after the lapse of the super-sleep mode shift time, without having to wait for the lapse of the sleep mode shift time. In this case, too, there is little need to turn on the power source of the image forming unit 8, the display panel 14 or the like after the facsimile is received. Therefore, as the operation state quickly shifts to the super-sleep mode, the operation with further restrained power consumption can be realized.

In the embodiment, after shifting to the sleep mode, the super-sleep control unit 108 further shifts the operation state to the super-sleep mode after the lapse of the super-sleep mode shift time. However, the processing by the super-sleep control unit 108 is not limited to this embodiment. If the execution of processing using the CPU 2 that remains in the sleep mode is likely to happen after the shift to the sleep mode, the super-sleep control unit 108 may perform processing not to shift to the super-sleep mode. For example, if the determination unit 112 searches for a job or the like stored in the memory 4, after the shift to the sleep mode, and determines that there is a job that needs to be executed by the CPU 2 without using devices such as the image forming unit 8, the super-sleep control unit 108 performs control not to shift to the super-sleep mode.

Moreover, a program that causes a computer constituting an MFP as an image forming apparatus to execute each operation (or a part of each operation) described above can be provided as a power-saving control program. In the embodiment, the functions (or a part of the functions) that embody the invention are realized as the CPU executes programs stored in the memory. However, the realization of the functions is not limited to the embodiment. A program to realize these functions may be downloaded to the apparatus from the network, or a similar program may be stored in a computer-readable recording medium and thus installed in the apparatus. As this recording medium, any form of computer-readable recording medium that can store programs may be used. Specifically, the recording medium may be, for example, an internal storage device built within a computer such as ROM or RAM, a portable storage medium such as a flexible disk, CD-ROM, DVD disk, magneto-optical disk or IC card, a database which holds computer programs, another computer and its database, or a transmission medium on a network line. The functions acquired by such pre-installation or downloading may be realized in cooperation with the OS (operating system) within the apparatus.

The program may be an execution module that is partly or entirely generated dynamically.

The invention can be carried out in various forms without departing from the spirit and scope of the invention. Therefore, the above embodiment is simply an example in every respect and should not be interpreted as limiting the scope of the invention. The scope of the invention is defined by the claims and should not be restricted by the specification. Moreover, all modifications, various improvements, alternatives and alterations within the range equivalent to the claims are within the scope of the invention.

As described above in detail, according to the invention, an image forming apparatus which is controlled to reduce power consumption effectively and thus has a high energy-saving effect can be provided.

What is claimed is:

1. An image forming apparatus comprising:
a sleep control unit which, in a normal operation mode in which power is supplied to a fixing device, if predetermined processing is not executed for a preset time or if an instruction to execute shifting to a power-saving mode with lower power consumption than in the normal operation mode is received, makes a shift to a sleep mode with a lower power consumption than in the normal operation mode, in which at least power supply to the fixing device is stopped; and
a super-sleep control unit which makes a shift to a super-sleep mode in which a power source of a processor is turned off if predetermined processing is not executed for a shorter time than the preset time after the shift to the sleep mode is made.

2. The apparatus according to claim 1, further comprising:
a signal acquisition unit which acquires a signal serving as a trigger to cancel the super-sleep mode; and
a restoration control unit which turns on the power source of the processor and cancels the super-sleep mode in accordance with the signal acquired by the signal acquisition unit, and thereby restores an operation state with higher power consumption than in the super-sleep mode.

3. The apparatus according to claim 2, further comprising a determination unit which determines whether or not the signal acquired by the signal acquisition unit forms a job that causes the image forming apparatus to execute processing, in the state where the operation state with higher power consumption than in the super-sleep mode is restored,
wherein the super-sleep control unit makes a shift to the super-sleep mode again if the determination unit determines that the acquired signal does not form a job.

4. The apparatus according to claim 2, further comprising a restoration timer which sends a cancelation signal to cancel the super-sleep mode to the signal acquisition unit at time that is registered in advance.

5. The apparatus according to claim 4, wherein the super-sleep control unit registers, in the restoration timer, time that is decided on the basis of time of reserved processing having the closest scheduled execution time or a time period until the scheduled execution time, of reserved processing with a processing execution time designated in advance, as the time when the restoration timer sends the cancelation signal.

6. The apparatus according to claim 5, wherein the super-sleep control unit registers, in the restoration timer, the time to send the cancelation signal immediately before the power source of the processor is turned off.

7. The apparatus according to claim 5, further comprising a reserved processing control unit which controls processing to execute the reserved processing at the designated time after the power source of the processor is turned on in accordance with the cancelation signal from the restoration timer.

8. The apparatus according to claim 1, wherein if there is a job to be executed by the processor after the shift to the sleep mode is made, the super-sleep control unit does not make a shift to the super-sleep mode.

9. A power-saving control method comprising:
in a normal operation mode in which power is supplied to a fixing device, if predetermined processing is not executed for a preset time or if an instruction to execute shifting to a power-saving mode with lower power consumption than in the normal operation mode is received, making a shift to a sleep mode with a lower power consumption than in the normal operation mode, in which at least power supply to the fixing device is stopped; and
making a shift to a super-sleep mode in which a power source of a processor is turned off if predetermined processing is not executed for a shorter time than the preset time after the shift to the sleep mode is made.

10. The method according to claim 9, further comprising:
acquiring a signal serving as a trigger to cancel the super-sleep mode; and
restoring an operation state with higher power consumption than in the super-sleep mode turning on the power source of the processor and cancelling the super-sleep mode in accordance with the acquired signal.

11. The method according to claim 10, further comprising:
determining whether or not the acquired signal forms a job that causes an image forming apparatus to execute processing, in the state where the operation state with higher power consumption than in the super-sleep mode is restored; and
making a shift to the super-sleep mode again if it is determined that the acquired signal does not form a job.

12. The method according to claim 10, further comprising sending a cancelation signal to cancel the super-sleep mode at time that is registered in advance.

13. The method according to claim 12, wherein time that is decided on the basis of time of reserved processing having the closest scheduled execution time or a time period until the scheduled execution time, of reserved processing with a processing execution time designated in advance, is registered as the time to send the cancelation signal.

14. The method according to claim 13, wherein the time to send the cancelation signal is registered immediately before the power source of the processor is turned off.

15. The method according to claim 13, wherein processing to execute the reserved processing at the designated time is controlled after the power source of the processor is turned on in accordance with the cancelation signal.

16. The method according to claim 9, wherein if there is a job to be executed by the processor after the shift to the sleep mode is made, a shift to the super-sleep mode is not made.

17. A non-transitory computer-readable recording medium having a power-saving control program recorded therein, the program causing a computer to execute processing comprising:
in a normal operation mode in which power is supplied to a fixing device, if predetermined processing is not executed for a preset time or if an instruction to execute shifting to a power-saving mode with lower power consumption than in the normal operation mode is received, making a shift to a sleep mode with a lower power consumption than in the normal operation mode, in which at least power supply to the fixing device is stopped; and making a shift to a super-sleep mode in which a power source of a processor is turned off if predetermined processing is not executed for a shorter time than the preset time after the shift to the sleep mode is made, and then acquiring a signal as a trigger to cancel the super-sleep mode, and if the power source of the processor is turned on to cancel the super-sleep mode in accordance with the acquired signal and thus an operation state with higher power consumption than in the super-sleep mode is restored, determining whether the acquired signal forms a job to cause an image forming apparatus to execute processing or not.

18. The non-transitory recording medium according to claim 17, wherein the power-saving control program is recorded, the program further causing the computer to execute processing to register time that is decided on the basis of time of reserved processing having the closest scheduled execution time or a time period until the scheduled execution time, of reserved processing with a processing execution time designated in advance, as time to send a cancelation signal to cancel the super-sleep mode.

19. The non-transitory recording medium according to claim 18, wherein the power-saving control program is recorded, the program further causing the computer to execute processing to register the time to send the cancelation signal immediately before the power source of the processor is turned off.

20. The non-transitory recording medium according to claim 18, wherein the power-saving control program is recorded, the program further causing the computer to execute processing to control processing to execute the reserved processing at the designated time after the power source of the processor is turned on in accordance with the cancelation signal.

* * * * *